Sept. 13, 1966  M. STAUNT  3,272,229
CONTROL UNIT FOR AIR DRIVEN DENTAL HANDPIECES
Original Filed March 12, 1959  10 Sheets-Sheet 1
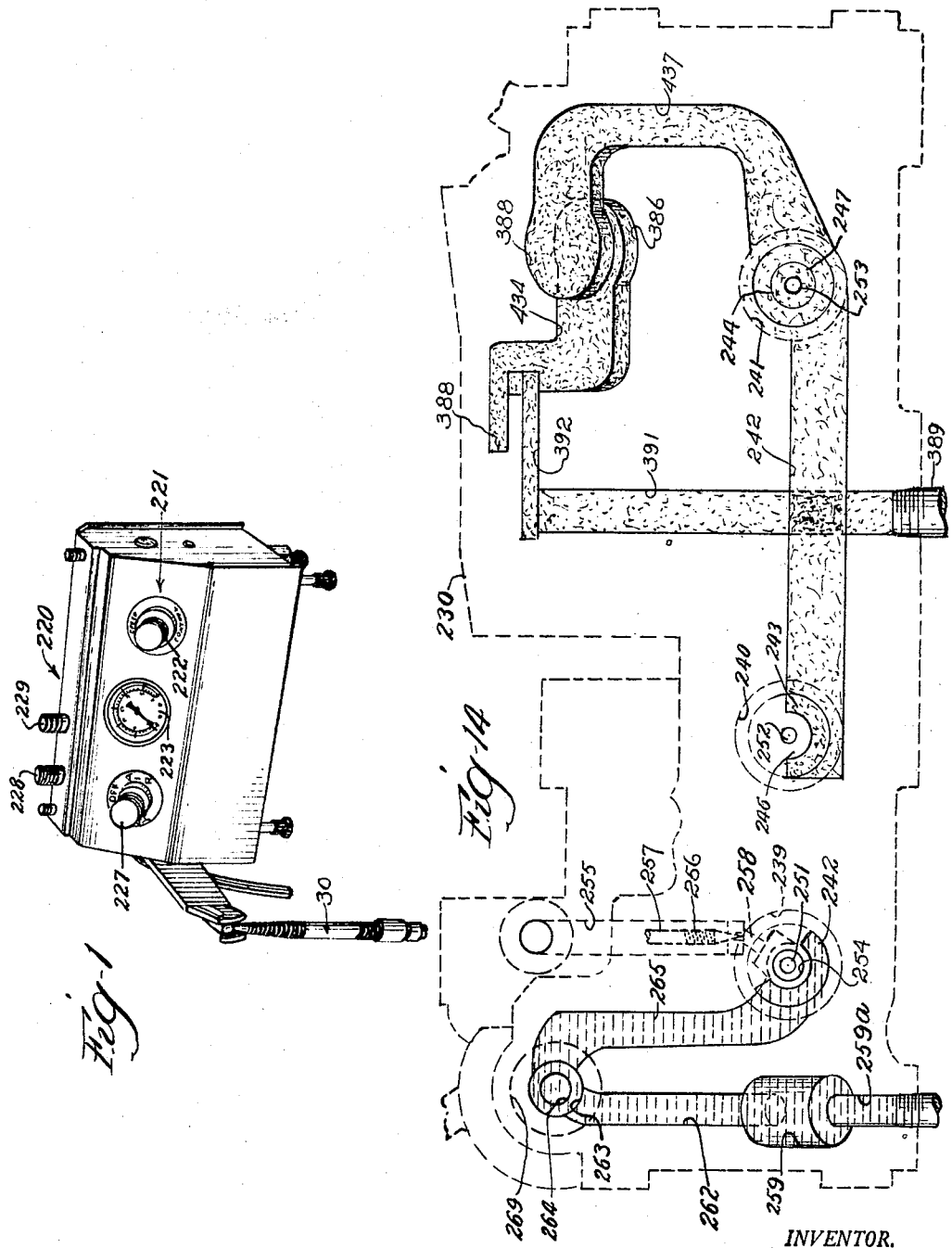

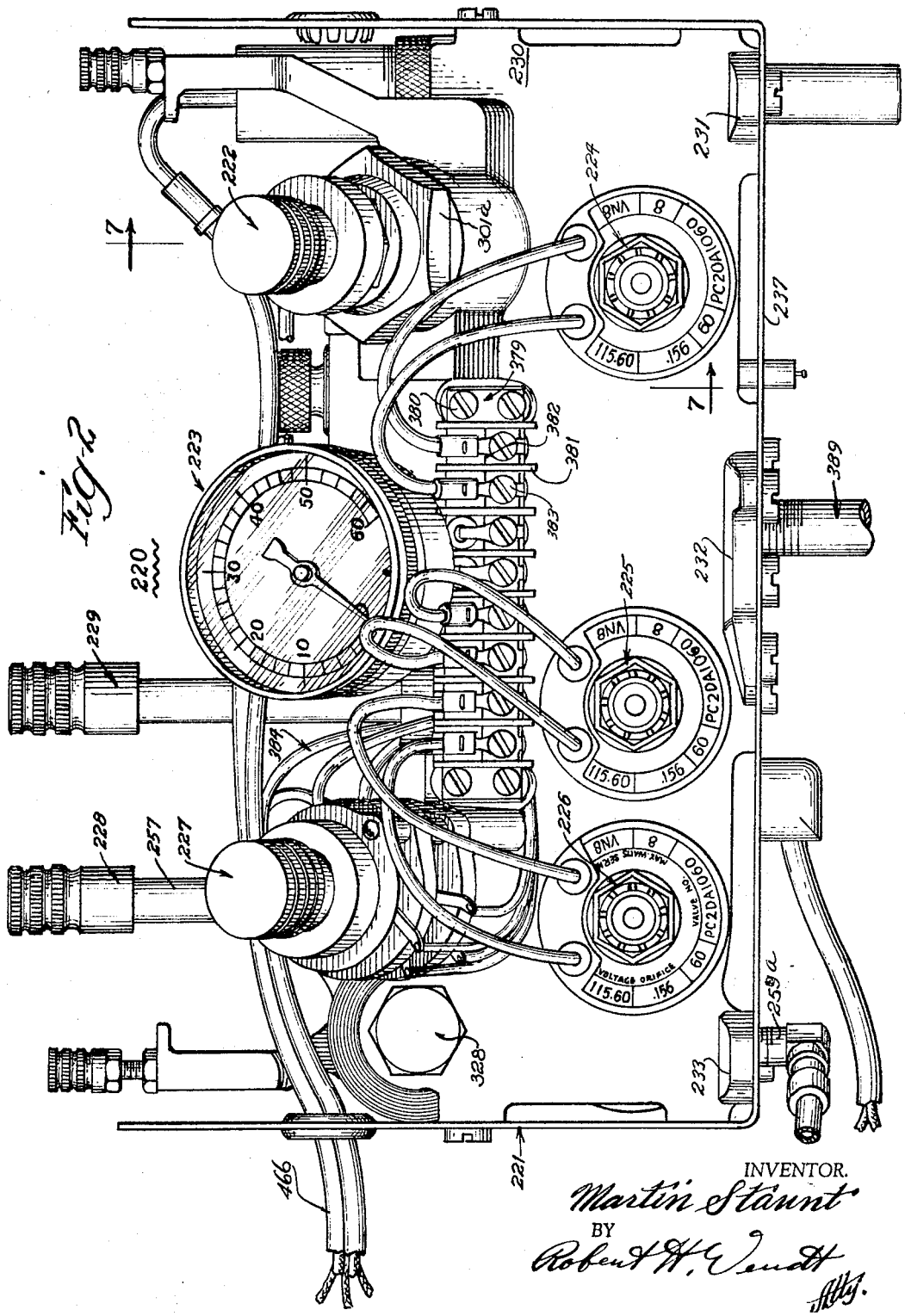

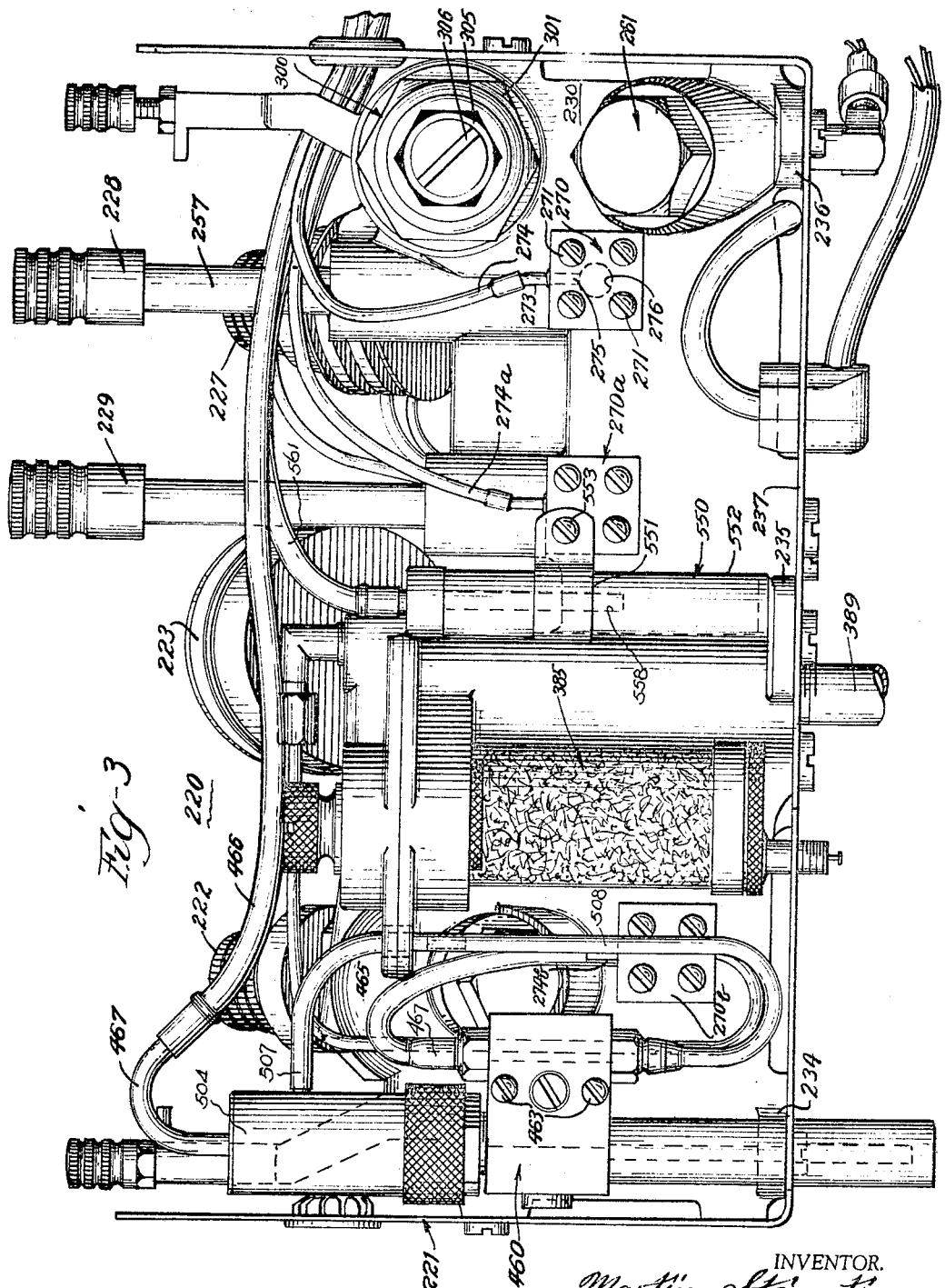

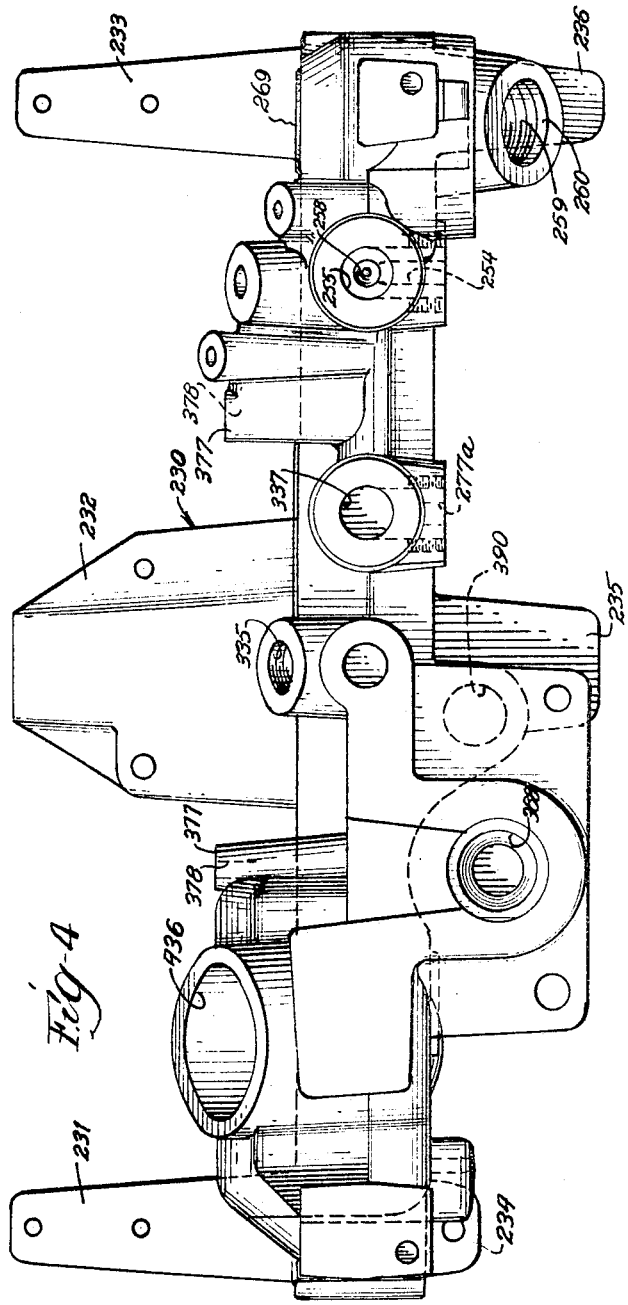

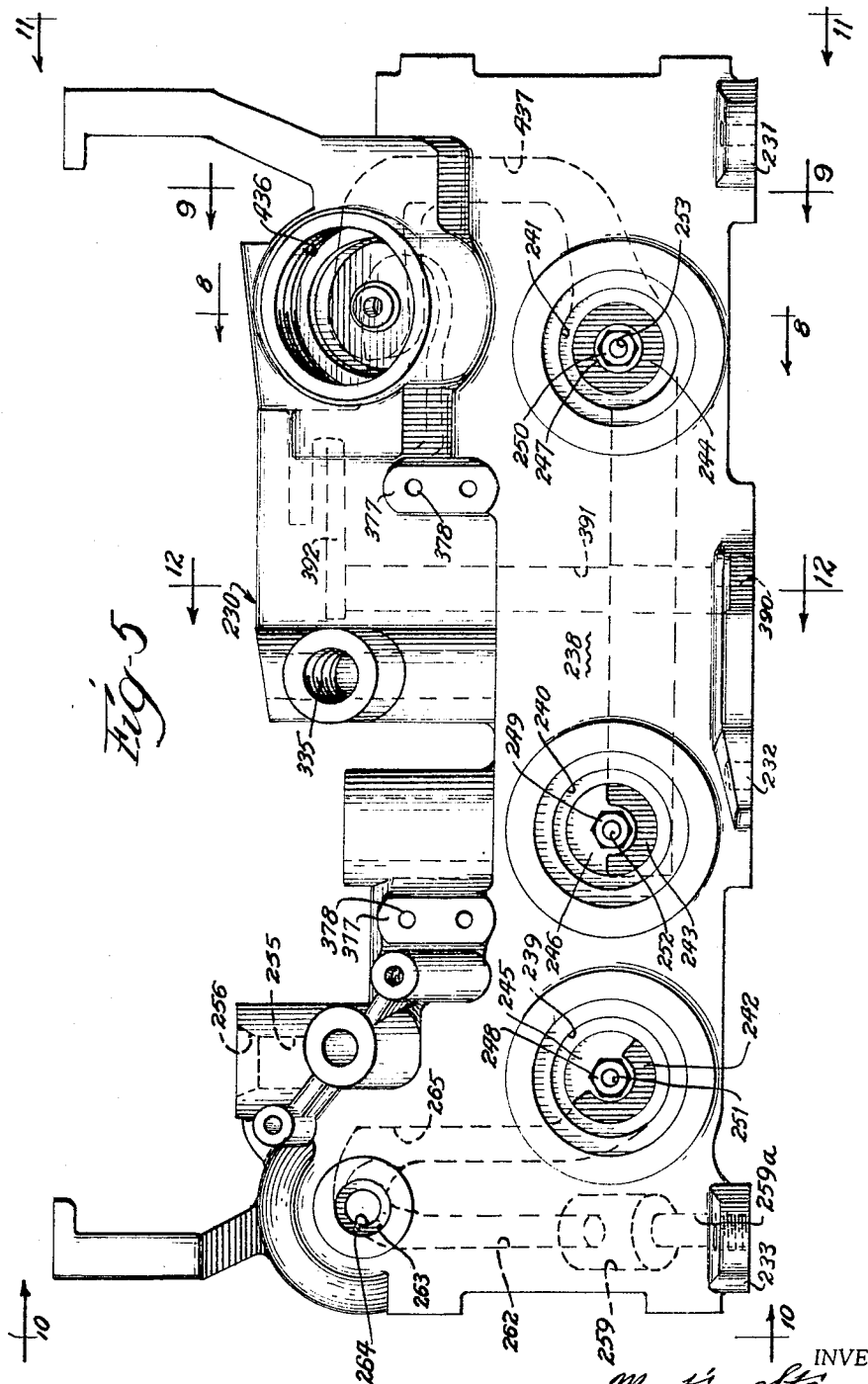

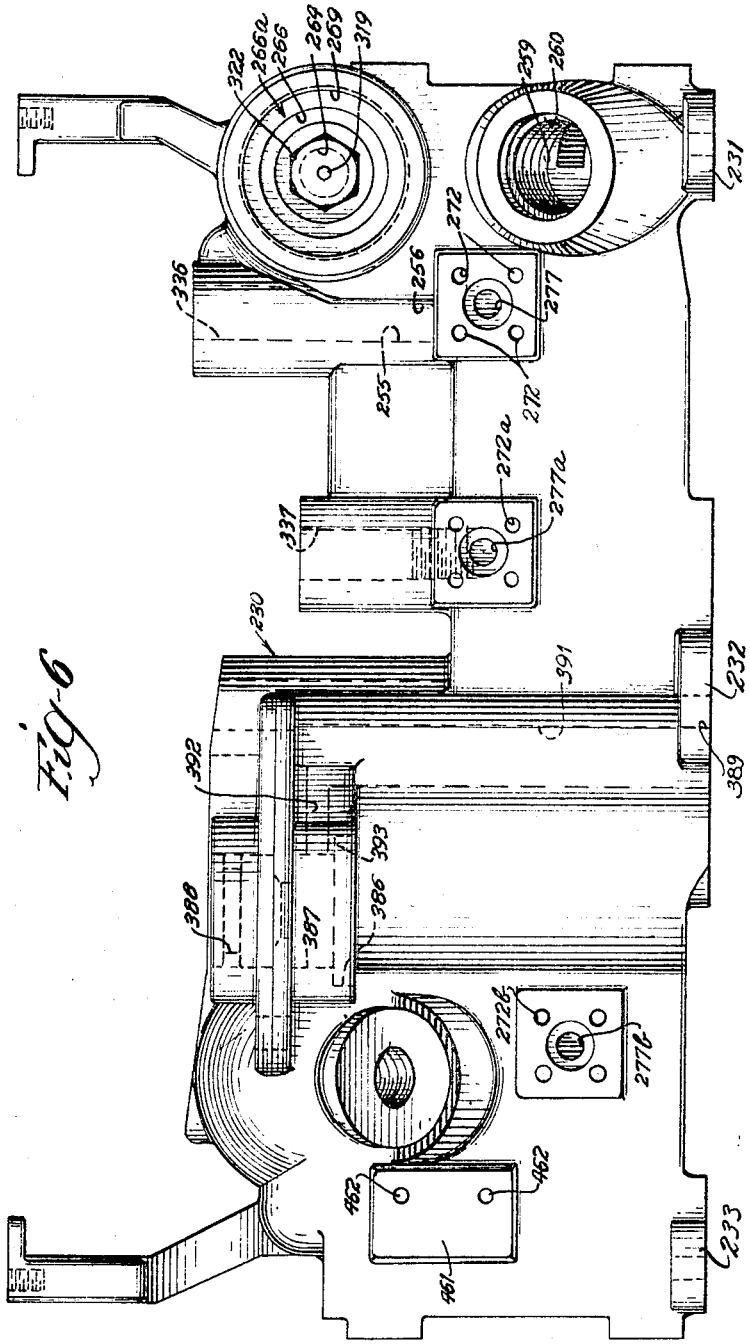

Sept. 13, 1966 M. STAUNT 3,272,229
CONTROL UNIT FOR AIR DRIVEN DENTAL HANDPIECES
Original Filed March 12, 1959 10 Sheets-Sheet 7
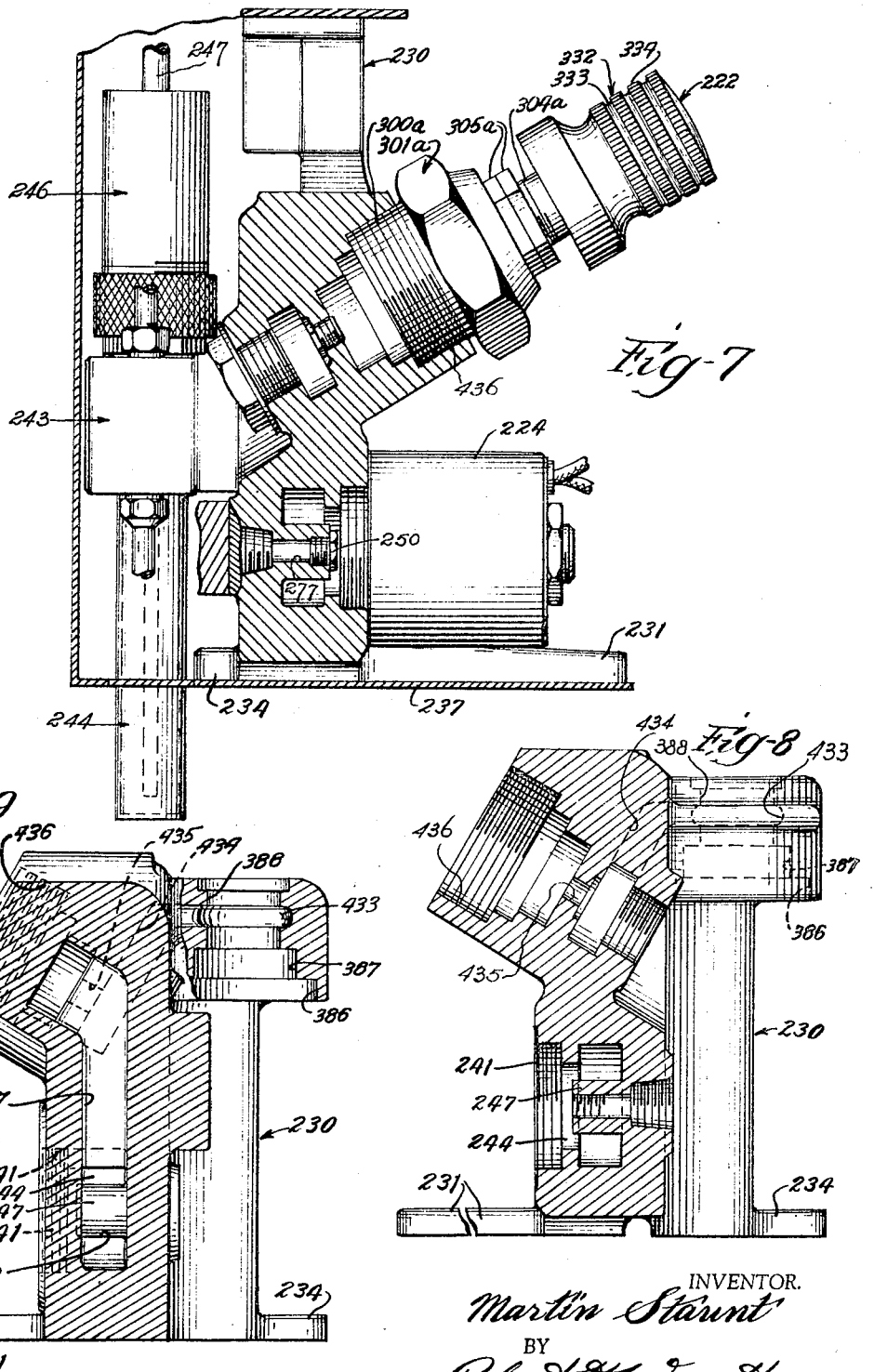

Sept. 13, 1966  M. STAUNT  3,272,229
CONTROL UNIT FOR AIR DRIVEN DENTAL HANDPIECES
Original Filed March 12, 1959  10 Sheets-Sheet 8
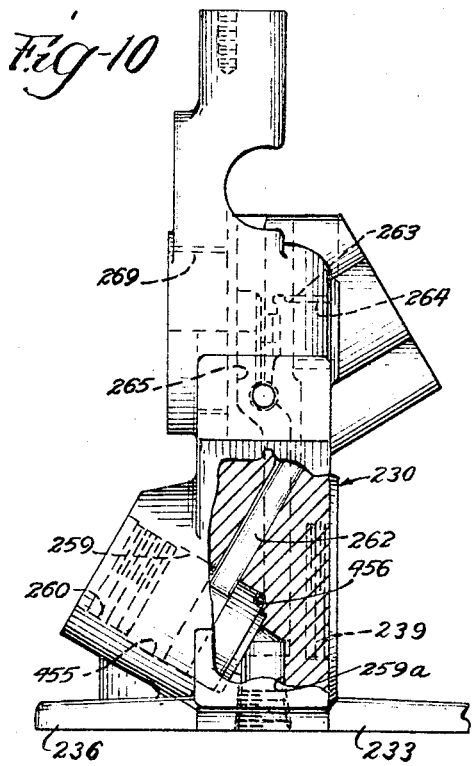
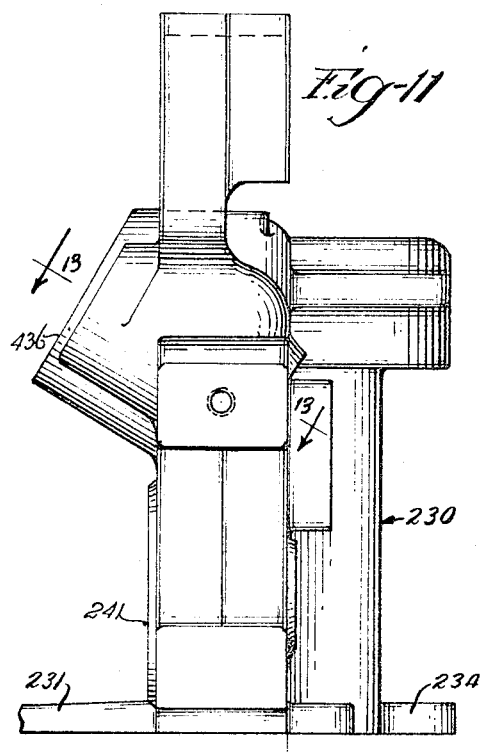
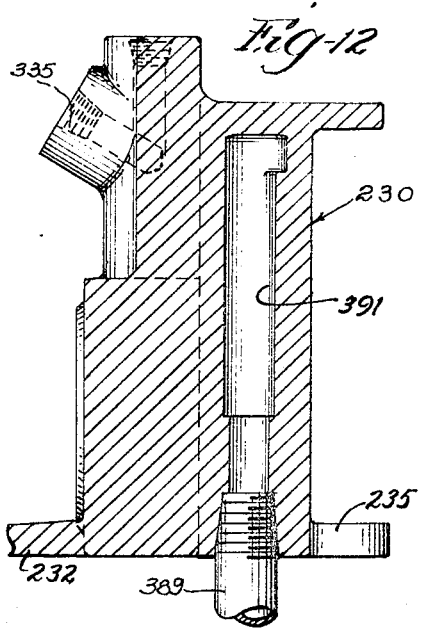
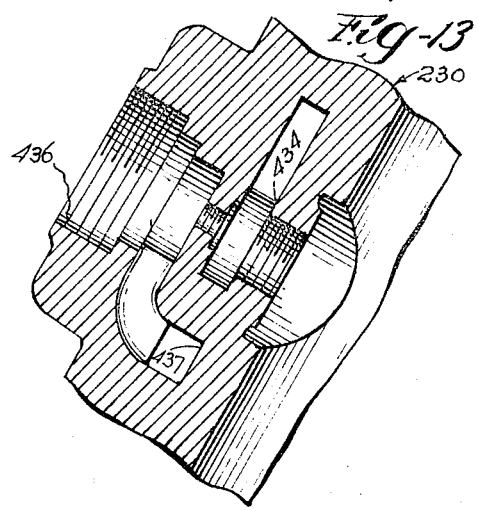
INVENTOR.
Martin Staunt
BY
Robert W. Wendt
Atty.

Sept. 13, 1966          M. STAUNT          3,272,229
CONTROL UNIT FOR AIR DRIVEN DENTAL HANDPIECES
Original Filed March 12, 1959          10 Sheets-Sheet 9
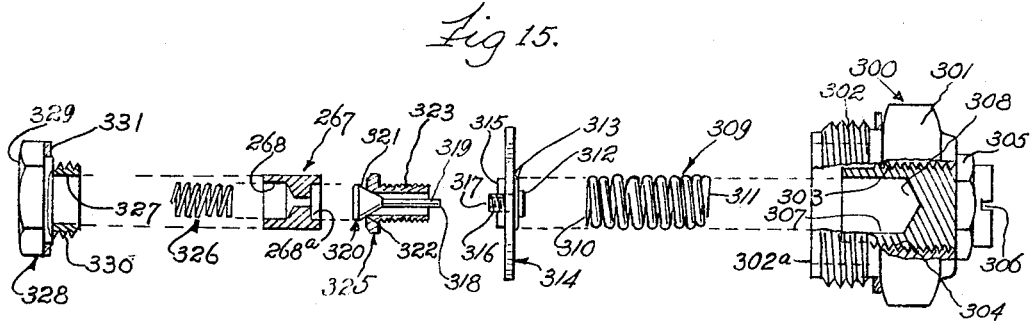
Fig. 15.
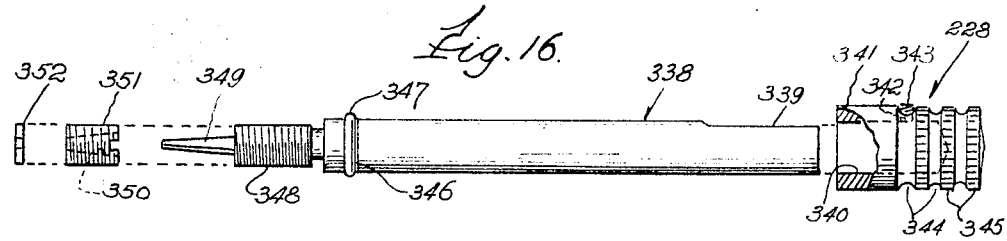
Fig. 16.
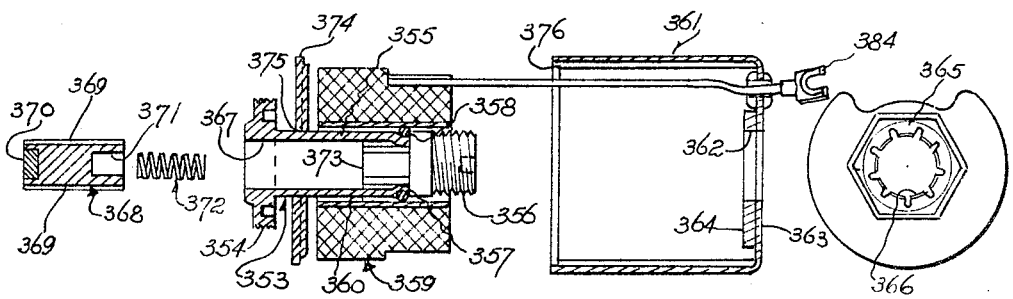
Fig. 17.
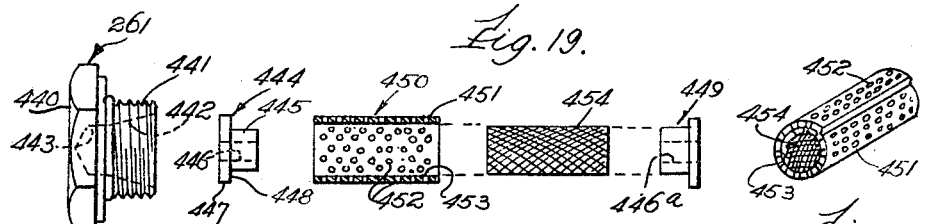
Fig. 19.
Fig. 20.
INVENTOR.
Martin Staunt,
BY Robert H. Wendt,
Attorney.

Sept. 13, 1966  M. STAUNT  3,272,229
CONTROL UNIT FOR AIR DRIVEN DENTAL HANDPIECES
Original Filed March 12, 1959  10 Sheets-Sheet 10
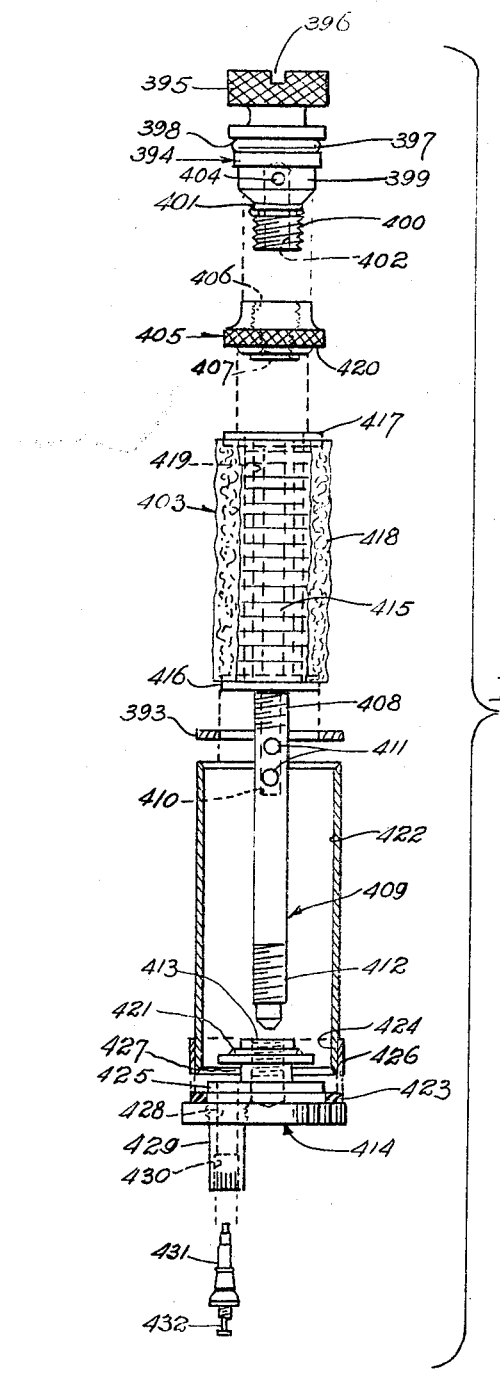
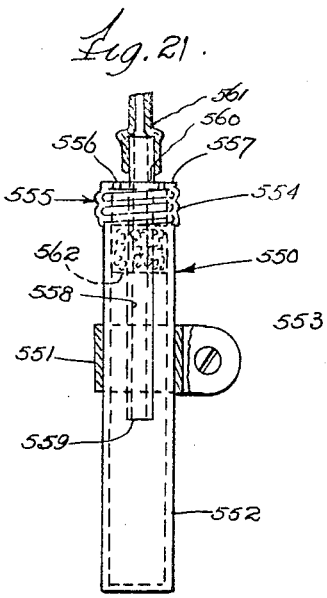
INVENTOR.
Martin Staunt
BY Robert H. Wendt.
Attorney.

United States Patent Office 3,272,229
Patented Sept. 13, 1966

3,272,229
CONTROL UNIT FOR AIR DRIVEN DENTAL
HANDPIECES
Martin Staunt, Des Plaines, Ill., assignor to American Hospital Supply Corporation, Evanston, Ill., a corporation of Illinois
Original application Mar. 12, 1959, Ser. No. 798,866. Divided and this application June 10, 1965, Ser. No. 469,028
5 Claims. (Cl. 137—544)

This application is a division of my copending application Serial No. 798,866, filed March 12, 1959, and now abandoned.

The present invention relates to control units for air driven dental handpieces, and is particularly concerned with the controls for operating, controlling, and providing air supply, lubricant supply, and water supply for the operation of air driven dental handpieces.

One of the objects of the invention is the provision of a control unit which assures the delivery of clean air under suitable pressure for driving an air turbine, clean water under suitable pressure for cooling the bur, edible lubricant for lubricating the bearings, warm air for blowing out and drying cavities, control of the speed of the handpiece, control of air volume and pressure, control of heated drying air, control of cooling water and the pressure and volume thereof, and control of the grinding operation and the blowing out of chips, without need for removing the handpiece from the mouth of the patient or for using a hot air syringe.

Another object of the invention is the provision of a control unit structure which eliminates many piping connections that might leak oil, water, or air, and which eliminates or greatly reduces the possibility of particulate matter (such as particles of pipe sealing compound) from getting into air lines and damaging an air-driven handpiece.

A further object is to provide a control unit structure including a unitary casting board to insure a smooth and unobstructed flow of air and water, thereby eliminating turbulence and "bumping" which might otherwise result in rapid wear of the bearings of an air driven dental handpiece.

Another object of the invention is the provision of a small, simple, and compact control unit which provides ample capacity in its conduit sizes with minimum loss of pressure in the conduits and minimum air turbulence therein.

Another object of the invention is the provision of an improved mounting unit for such a control, having cored passages leading to outlets for all of the components, each of which may be replaced or serviced independently of the others, without disturbing pipe connections.

Other objects and advantages of the invention will be apparent from the following description and the accompanying drawings, in which similar characters of reference indicate similar parts throughout the several views.

Referring to the drawings, of which there are nine sheets,

FIGURE 1 is a view in perspective of the control unit for air driven dental handpieces;

FIGURE 2 is a front elevational view of the unit with the front and rear covers removed;

FIGURE 3 is a similar rear elevational view;

FIGURE 4 is a top plan view of the manifold casting of FIGURES 2 and 3;

FIGURE 5 is a front elevational view of the manifold casting;

FIGURE 6 is a rear elevational view of the manifold casting;

FIGURE 7 is a sectional view, taken on the line 7—7 of FIGURE 2, looking in the direction of the arrows;

FIGURE 8 is a sectional view, taken on the plane of the line 8—8 of FIGURE 5, looking in the direction of the arrows;

FIGURE 9 is a sectional view, taken on the plane of the line 9—9 of FIGURE 5, looking in the direction of the arrows;

FIGURE 10 is an end elevational view, taken on the plane of the line 10—10 of FIGURE 5, looking in the direction of the arrows;

FIGURE 11 is an end elevational view, taken on the plane of the line 11—11 of FIGURE 5, looking in the direction of the arrows;

FIGURE 12 is a sectional view, taken on the plane of the line 12—12 of FIGURE 5, looking in the direction of the arrows;

FIGURE 13 is a fragmentary sectional view taken on the plane of the line 13—13 of FIGURE 11, looking in the direction of the arrows;

FIGURE 14 is a diagrammatic front elevational view showing the manifold casting in dotted lines and the course of the water and air in the cored conduits of the control unit casting;

FIGURE 15 is an exploded view in partial section of the parts of the water pressure regulator valve;

FIGURE 16 is an exploded view showing the parts of one of the needle valves for controlling the volume and pressure of water or air;

FIGURE 17 is an exploded view in partial section showing the parts of one of the solenoid valves;

FIGURE 18 is an exploded view showing the parts of the air filter;

FIGURE 19 is an exploded view showing the parts of the water filter;

FIGURE 20 is a view in perspective of the filter element assembly;

FIGURE 21 is a fragmentary elevational view of the oil trap for removing lubricant from the exhaust air.

Referring to the drawings in greater detail, the control unit 220 (FIGURES 1 and 2) is enclosed in a housing unit 221, the face of which is provided with a rotating knob 222 controlling the air valve, which is located in the conduit extending from the source of air pressure to the control unit. The air valve controlled by knob 222 controls the volume and pressure of air supplied to the handpiece.

The rotated speed of a turbine increases with increased air pressure; therefore, the speed of operation may be increased by turning knob 222 in one direction or reduced by turning the knob in the opposite direction.

The unit supports an air gauge 223 connected in the air line extending from the pressure regulator 222 and indicating the pressure of the air applied to the handpiece turbine and the knob 222 is preferably set so that the pressure indicated on the gauge 223 is that recommended by the instruction manual, such as, for example, 20 pounds.

The conduit leading from the source of air supply includes a solenoid valve, indicated at 224, for turning on and off the drive air. 225 indicates another solenoid valve for turning on and off the air which is supplied to the handpiece for blowing out and drying the cavity and this is called the chip blower solenoid.

226 indicates the water solenoid valve which controls the flow of water to a handpiece for cooling a tooth and the grinding bur.

227 indicates the selector control switch which may be used to turn off the electric circuits or to turn them to the left to turn on the water solenoid and the air drive solenoid 224, or to the right to turn on the chip blower solenoid and to provide heat for heating the air used in blowing out and drying a cavity.

The knob 228 controls the needle valve in the water conduit leading to the water tube of a dental handpiece for adjusting the water spray intensity and volume, and the knob 229 controls a needle valve in the conduit leading to a handpiece air tube for adjusting the air volume and pressure of warm air issuing from the chip blower of a handpiece.

Referring to FIGURES 4, 5, and 6, these are views of the top, front, and rear of the control unit casting, which is provided with cored conduits, inlets, and outlets for mounting all of the component parts of the control unit. The casting is indicated in its entirety by the numeral 230.

Casting 230 is preferably formed of aluminum and is provided with a plurality of forwardly and rearwardly extending foot flanges 231, 232, 233, 234, 235, and 236 having suitably threaded apertures for securement to the housing bottom plate 237.

The casting is formed on its front side 238 with three threaded bores 239, 240, and 241 for receiving the soft steel cores which form a part of the solenoid valves 224–226, further to be described. Each of the bores communicates with an aperture 242, 243, and 244 surrounding a central body portion 245, 246, and 247, each of which is provided with a threaded aperture for receiving an externally threaded valve seat member 248, 249, and 250. The valve seat members have apertures 251, 252, and 253 and have frusto-conical surfaces surrounding said apertures.

The aperture 251 in valve seat 248 communicates with a backwardly extending conduit 254 leading to a vertically extending conduit 255 which is threaded at its lower end 256 to receive a threaded stem 257 of a needle valve (FIGURE 14) actuated by knob 228 (FIGURES 1–3).

The conduit 255 terminates at its lower end in a tapered bore 258 for receiving the needle valve, which bore communicates with the lateral conduit 254.

The casting is formed with a water inlet, comprising a threaded bore 259a (left side of FIGURE 5) which extends upwardly and is adapted to receive a pipe extending from a local water supply. Bore 259a communicates with a cylindrical bore 259 for containing a water filter, to be described hereinafter, and bore 259 ends in a threaded portion 260 (FIGURE 10) for receiving the threaded plug 261 (FIGURE 3) which carries the water filter and which closes the threaded bore.

From the filter chamber 259, a cored conduit 262 extends upwardly (FIGURES 5 and 10) and communicates with the threaded bore 263 which in turn communicates with a smaller rearwardly extending bore 264. The rearwardly extending bore 264 communicates with a laterally extending cored passage 265 which extends downwardly and communicates with opening 242.

The bore 264 is threaded and communicates with a chamber 266 (FIGURE 6) which is adapted to receive a valve seat member 322 having a central stem 319 extending rearwardly. The chamber 266 ends in a threaded bore 269 on the rear side of the unit for receiving the parts of a pressure regulator valve, further to be described.

Referring to FIGURE 3, the numeral 270 indicates a water connection block secured to the casting by four screw bolts 271 passing through the block and threaded into threaded bores 272. The water connection block has a laterally extending metal water tube 273 which is in turn connected to a plastic water hose 274.

The water tube 273 communicates with a lateral conduit 275 in the block and with a central conduit 276 in the block, communicating with the bore 277 leading to the valve opening 251 (FIGURE 5).

Thus, the water is adapted to come in at the inlet 259a to be filtered by the filter in chamber 259. It passes upwardly through cored conduit 262 to the pressure regulator valve which regulates its pressure. The water then passes downwardly through the conduit 265 to the aperture 242, then rearwardly through the solenoid valve aperture 251 to the conduit 258 where it is throttled by the needle valve controlled by knob 228; and thereafter the water passes into the conduit 277 leading to the conduits 276 and 275 in the water connection block 270, which delivers the water to the plastic tube 274, to be carried to the water nozzle of a dental handpiece.

The casting 230 is, therefore, provided with suitable ports and conduits for providing a water inlet leading to a water filter, from the filter to the water pressure regulator valve, from the water regulator valve to a conduit controlled by a needle valve, for determining the amount of water, and from the needle valve to the plastic tube which delivers the water to the handpiece.

*Water pressure regulator valve*

Referring to FIGURE 15, this is an exploded view of the parts of a water pressure regulator valve which is mounted in the threaded bore 269 (FIGURE 6) and the communicating bores leading to the bore 263 on the front side of the unit.

The bore 269 is adapted to receive a threaded plug 300 (FIGURE 15) having a non-circular head 301 and a threaded portion 302 provided with a gasket and threaded into bore 269. The plug 300 has a threaded bore 303 for receiving a threaded spring adjustment plug 304, which is provided with a nut 305 for securing it in any adjusted position, and a slot 306 in its end for receiving a screwdriver blade.

The threaded plug 304 has a cylindrical bore 307 with a reduced portion 308 for receiving and seating an adjustment spring 309. The adjustment spring comprises a helical member of spring bronze formed with a plurality of spaced turns and tapered at its ends 310 and 311 to present flattened ends engageable with the adjacent parts.

The spring end 311 seats in socket 308. End 310 extends about a lug 312 which is formed on an aluminum plate 313 passing through a diaphragm 314 of rubber with reenforcing fabric.

The diaphragm 314 is clamped between the plate 313 and a circular disc 315 on a threaded lug 316. The lug 316 has a central bore 317 for receiving and seating the end 318 of stem 319 of water valve 320.

The water valve has a narrow cylindrical metal stem 319 which is anchored in a conical head 321 of rubber adapted to seat in a valve seat member 322 having external threads 323 and a hexagonal head 325.

The valve seat member 322 is threaded into the bore 264 (FIGURE 5), and valve 320 is engaged by a spring guide 267 having a socket 268 for receiving a smaller helical valve spring 326 which in turn is seated in a socket 327 in a closure plug 328. The closure plug has a non-circular head 329 and a threaded body 330 supporting a gasket 331. Spring guide 267 has another cylindrical socket 268a for receiving the cylindrical end of conical head 321.

When installed in the casting 230, the diaphragm 314 engages an annular shoulder 266a in bore 269, against which it is clamped, adjacent its outer edge, by annular end 302a of screw plug 300.

The operation of the water pressure regulator is as follows: Spring 326 tends to close the valve 320, the end of which engages the diaphragm 314; and spring 309 tends to open the valve 320 and is stronger than the spring 326.

Water entering the conduit at the left of valve 320 (viewed as in FIGURE 15) builds up a pressure and acts on the diaphragm, which engages and compresses spring 309, permitting the spring 326 to close the valve. The pressure of the water in the conduits on the left side of the diaphragm 314 depends on the water pressure connected to the inlet and upon the adjustment of spring 309 by adjustment plug 304.

When the water pressure has built up against the diaphragm 314 to a predetermined level, the valve is closed; but as soon as the pressure on the water is reduced, the valve is again opened; and the valve continues to open and close, as required, to maintain a substantially constant pressure of water supplied to the water nozzle of a handpiece.

*Air pressure regulator*

The air pressure regulator, controlled by knob 222 and mounted in threaded bore 436 (FIGURE 5), is of substantially the same construction as the water pressure regulator, except that the air pressure regulator knob 222, which adjusts the tension of a spring equivalent to spring 309, is in the form of a knob instead of a headed member having a slot 306.

The air pressure regulator is mounted in the same type of threaded member 301a (FIGURE 7) and has a threaded shank 304a, which may be secured in any adjusted position by a pair of lock nuts 305a, since the air pressure is intended to be regulated manually by the user, whereas the water pressure, when once adjusted, is not to be changed.

Thus, the knob 222 is mounted on the threaded shank 304a, and preferably has a substantially cylindrical body 332 formed with a plurality of grooves 333 between the lands 334, the latter being knurled for convenient grip with the fingers. As indicated in FIGURE 1 on the face of the unit, the air pressure knob adjusts the speed at which the air-driven hand-piece operates, and the speed increases with an increase in the tension or compressive force applied to the spring which corresponds with previously-described spring 309.

The amount of air pressure at any adjustment of the knob 222 is indicated on the pressure gauge located in the middle of the front of the unit, such gauge being mounted in threaded bore 335 (FIGURE 5).

The operating pressure of 20 pounds per square inch is recommended for the normal setting of knob 222. This provides an adequate torque, utilizing 1.1 cubic feet of air per minute. By providing hydraulic or electrical control for adjusting the pressure of the air regulator spring corresponding with spring 309, the air pressure may be varied from 0 to 20 or 25 pounds per square inch; and the same control may be exercised by manually turning knob 222. The speed of operation of the handpiece may thus be varied manually from 0 to a maximum of 250,000 r.p.m. or more by adjustment of knob 222. For bulk removal, 15 to 20 pounds gauge pressure is recommended, and for fine finishing of a cavity 10 to 15 pounds gauge pressure has been found effective.

*Water spray and chip air control*

The needle valves, actuated by knobs 228 and 229, control the volume and pressure of the water spray at the handpiece, and also control the volume and pressure of heated air for cleaning out and drying cavities. These needle valves, respectively actuated by knobs 228 and 229, may be identical in construction, and are installed in the threaded bores 336 and 337, respectively (FIGURE 6).

Referring to FIGURE 16, this is an exploded view of the construction of the metering valves for water and chip air. Each valve comprises an elongated stainless steel shank 338 of cylindrical form and provided with a flattened end portion 339 for receiving the knob 228 or 229.

Each knob comprises a cylindrical member having a socket 340 for receiving the end of the shank 338 and having a cylindrical body 341 provided with a threaded bore 342 for receiving a clamping screw 343 of the type having a non-circular socket.

The upper end of the body 341 has grooves 344 and knurled lands 345 for convenient grip with the fingers.

The shank 338 has a groove 346 containing a rubber O-ring 347 for an air or water seal in the lower end of each bore 336 or 337, which bores are threaded only at their lower ends to engage the threaded portion 348 of the metering valve.

The metering valve preferably has an elongated narrow tapered end portion 349 which is frusto-conical in form and which is adapted to fit into a complementary bore 350 in a metering valve seat member 351. The member 351 is threadedly installed in the lower end of bore 337 or 336 for forming a valve seat.

A rubber valve seat washer 352 is clamped in the bore 337 (or 336) below the valve seat member 351 to insure against leakage, and the metering valves are adapted to be adjusted by rotation of the knobs 228 and 229 to vary the pressure and flow and volume of water or air.

The solenoid valves 224, 225, and 226 may be identical in construction. Each solenoid valve includes a valve seat member 248, 249, and 250 (FIGURE 5). As shown in FIGURE 17, each solenoid valve has a magnetic core member 353 with an enlarged cylindrical externally threaded base 354 for reception in each of the bores 239–241.

Core member 353 has a body 355 of reduced cylindrical shape and a threaded end 356. A peripheral groove 357 extending about the body contains a rubber O ring 358. The body 355 supports an insulated solenoid coil 359 and the O ring engages inside the cylindrical bore 360 of the coil assembly to prevent leakage.

A cover 361, preferably of magnetic metal, is adapted to slide over the coil 359 and has an aperture 362 for passing the threaded portion 356 of the core. The end wall 363 of the cover may have an insert 364 of magnetic metal for improving the path for magnetic flux.

A hexagonal sheet metal nut 365 has a threaded aperture 366 for clamping the cover on the coil. The core 353 has a cylindrical bore 367 for receiving a solenoid plunger 368, which is preferably of cylindrical form.

The plunger 368 is made of magnetic metal and has a pair of longitudinal grooves 369 in its opposite sides for passing air out of the bore 367. Plunger 368 has a rubber valve washer 370 mounted in a socket in its end in position to engage and close in one of the valve openings 251–253.

Each plunger has a cylindrical bore 371 in its right end and a coil spring 372 mounted in each bore 371. The spring reacts against the base 373 of the bore 367 to urge the plunger and its valve disc 370 into closed position. The solenoid valve is opened in each case by passing a suitable current through the coil assembly 359.

A housing end plate 374 of magnetic metal has a cylindrical aperture 375 for passing the threaded shank 353 of the core. The end plate fits against the open end 376 of the solenoid housing and completes the magnetic circuit which includes the core 353, housing 361, and end plate 374.

Each solenoid valve includes a rear block like the block 270, which provides a conduit leading to the plastic hose 274; and the other two blocks are indicated at 270a and 270b (FIGURE 3) leading to the conduits 274a and 274b.

The front of the casting 230 is provided with two forwardly projecting lugs 377 (FIGURE 4) with a pair of threaded bores 378 for mounting an insulated connector block 379 (FIGURE 2) by means of screw bolts 380.

The connector block comprises an elongated molded insulating member having a multiplicity of molded partitions 381 separating the block into chambers 382 for receiving the screw bolts 383 by means of which the various conductors from the solenoids are secured and connected to insulated wires 384 which lead to the selector switch controlled by knob 227.

*Air and water filter assemblies*

The control unit includes an air filter 385 (FIGURE 3) which is included in the air line leading from the air inlet.

FIGURE 18 is an exploded view of the parts of the air filter which is mounted on the rear of the unit in a bore 386 (FIGURE 6) leading to a smaller counterbore 387 and a threaded bore 388. The air inlet to the control unit is at 389 (FIGURE 2) and comprises a pipe leading to a threaded bore 390 (FIGURE 4) which communicates with an upwardly extending cored conduit 391 (FIGURE 6).

The cored conduit communicates through a laterally extending cored conduit 392 (FIGURE 6) with the counterbore 387, and the bore 386 is adapted to receive a rubber gasket 393, forming part of the filter assembly shown in FIGURE 18.

The filter assembly (FIGURE 18) includes an upper supporting screw bolt 394 having a knurled head 395 provided with a screwdriver blade slot 396. The screw bolt 394 has a groove containing an O ring 397 below the annular shoulder 398, and it has a cylindrical body 399 and a reduced threaded portion 400. A second O ring 401 is mounted in a groove at the end of cylindrical body 399.

The supporting screw bolt 394 has a central bore 402 which communicates with the interior of the filter unit 403. Bore 402 communicates with a plurality of laterally extending bores 404.

The air filter includes an end clamping member 405 having a threaded bore 406 for mounting on the reduced threaded portion 400, and it has a smaller threaded bore 407 in the other end for receiving the threaded end 408 of a central conduit tube 409, which also serves to support the parts of the filter.

Conduit tube 409 has a bore 410 and a pair of through transverse apertures 411 to carry air from the inside of the filter unit 403. Tube 409 has a threaded end 412 for securement in a threaded bore 413 in the clamping plate 414 which closes the other end of the filter.

The filter element 403 comprises a brass wire mesh cylinder 415 having cork washers 416 and 417 at its opposite ends and having a wrapping 418 of cotton string forming a cylinder. The wire mesh cylinder 415 has a bore 419, and the air to be filtered enters the transparent sleeve 422 and passes inward through the wrapped string element 418.

The filter element 403 is clamped between the threaded member 405 at the annular shoulder 420 and against the annular shoulder 421 at the end clamping member 414. The filter element 403 is secured by a transparent cylindrical plastic sleeve 422 which has its upper end engaging the rubber gasket 393 in the bore 386.

The lower end of the transparent sleeve 422 engages the rubber gasket 423 which is mounted in a bore 424 in the end clamping plate 414 about a cylindrical portion 425 which fits inside and centers the plastic sleeve.

The end plate 414 preferably has a cylindrical skirt 426 surrounding the plastic sleeve 422, and has an annular groove 427 for communicating with the inside of the plastic sleeve 422. A bore 428 extends from the groove 427 to an internally threaded sleeve 429 having threads 430 adapted to receive an ordinary stem valve 431 of the type employed in automobile tires.

Any moisture which collects in the bottom of the filter assembly can be discharged from time to time by pressing upwardly on the valve stem 432.

The filter assembly is secured together by mounting on the tube 409 which is threaded into the end of clamping plate 414 and into the top clamping member 405, completing the assembly. The plastic sleeve 422 is mounted around the filter element.

The screw bolt 394 is threaded into the threaded bore 388 (FIGURE 6) and draws the filter unit upwardly, clamping the transparent sleeve in the bore 386 against the rubber gasket 393, making an air-tight connection.

The course of air through the filter is as follows: The air comes in at the cored conduit 391 and passes upwardly and laterally through the cored conduit 392. This leads to the bore 387 and the bore 386 and to the inside of the transparent sleeve 422.

The air passes inwardly through the string filter element 418 and into the transverse bores 411 and central bore 410. The central bore 410 leads to the threaded bore 407 in the end clamping plate 405 and goes into the bore 402 of the screw bolt 394.

The screw bolt 394 is located in bore 388 and has a cylindrical surface 399 which is surrounded by the annular groove 433 communicating with the cored conduit 434. The air passing up the bore 402, after being filtered, flows out of the apertures 404 into the groove 433 and into the cored conduit 434 (FIGURE 9).

Cored conduit 434 leads to the bore 435, which extends to the threaded bore 436 for receiving the regulator valve assembly. The outlet from the regulator valve assembly extends downwardly through cored conduit 437 to the bore 438 and threaded bore 241, which receives the solenoid valve assembly for the air solenoid 224.

Thus, the incoming air is filtered in the filter assembly 385 and carried to the air regulator valve controlled by knob 222, after which it passes to the conduits controlled by the solenoid valve 224 so that the air is turned off except when the solenoid valve 224 is actuated; and the pressure of the air is constantly regulated by the air pressure regulator valve.

The air filter is adapted to remove 70 percent of particles larger than 2 microns in size and 90 percent of particles larger than 5 microns in size. It also removes moisture in the air line and, as the air driven turbine operates at high speeds and with extremely small clearances, it is important that the driving air be clean of dust, rust, and other particles.

The water filter assembly is shown in an exploded view in FIGURE 19 and is mounted in the threaded bore 260 which is closed by screw plug 261. The screw plug 261 comprises a threaded plug having a non-circular head 440 and a threaded body 441 which has a tapered bore 442 ending in a cylindrical bore 443. The tapered bore is adapted to receive the resilient soft rubber end plug 444 of the filter unit, such plug comprising a resilient member having a cylindrical body 445 provided with a thorough bore 446 and a radial flange 447 having an annular shoulder 448.

The other rubber end plug 449 may be identical in construction to plug 444. The two plugs support a strainer body 450 having a perforated supporting housing 451 comprising a perforated sheet of glass having a multiplicity of small apertures 452. The sheet is wrapped into the form of a cylinder with its ends abutting and has a through bore 453.

Another cylinder of fine screen 454 is located in the bore 453 and is supported by the housing 451. The bore formed in the filter unit 450 is large enough to receive the rubber plugs 445 so that the ends of the filter unit 450 engage the annular shoulder 448.

The screen of the water filter is sufficiently fine to remove all particles of rust or other material and is, for example, a 200 mesh per square inch screen. When the plug 444 is mounted in the tapered bore 442, the screw plug closes this end of the filter unit and, when the screw plug 261 is installed in the bore 260, the filter unit, including the perforated body screen and other plug 449, are received in the bore 259.

Bore 259 communicates with cored conduit 262 which in turn communicates with the annular space 455 surrounding the body 450 of the filter. The water inlet 259a communicates with the bore 456, and the water passes in the aperture 446a of the plug 449 and outwardly through the screen 454 and the perforations 452.

From the bore 455, which surrounds the screen, the filtered water passes up the cored conduit 262 which leads to the water regulator valve. Thus, the water is filtered and is cleared of any particles before passing through the water regulator valve.

Other components

The control unit 220 also includes a lubricator mounted on the rear of the cabinet and indicated in its entirety by the numeral 460 (FIGURE 3). This lubricator may be constructed substantially as disclosed in my prior application, Serial No. 757,062, filed August 25, 1958, now Patent 2,943,705. The lubricator is adapted to be supported upon the casting 230 on its rear side on a rearwardly projecting lug 461 (FIGURE 6) having a flat face and a pair of threaded bores 462. These threaded bores adapted to receive two screw bolts 463 (FIGURE 3) which clamp the lubricator, also called a nebulizer for the reason that it is adapted to atomize an edible lubricant and introduce the lubricant mist into the air stream of the driven air which drives the air turbine of the dental handpiece controlled by the unit.

The lubricator has its inlet at the ribbed inlet fitting 264 which is connected by a plastic tube 465 to the outlet tube 274b of the solenoid valve block 270b containing conduits extending from the valve port 253 and controlled by the drive air solenoid 224. The plastic tube 465 carries drive air which has been filtered by the air filter 385, such air being regulated by the air pressure regulator valve controlled by knob 222 and being delivered to the dental handpiece through the plastic hose 466 which is connected to the outlet tube 467 at the top of the lubricator (FIGURE 3).

The lubricator is adapted to supply the handpiece with lubrication in the form of a lubricant mist which deposits a film of lubricant on the ball bearing races, on the balls, and on the ball retainer, of a turbine-driven dental handpiece. Whenever the drive air is turned on, lubrication is also provided, and also cooling air is directed out of the lower end of the handpiece head into a conical stream towards the cutting end of the tool and into the cavity which is being prepared.

An exhaust air oil trap is also illustrated in FIGURE 3, being designated by the numeral 550.

Since the drive air contains oil mist, it is important that the exhaust air be carried away from the handpiece and from the vicinity of the patient and the dentist, and that the oil be removed from the air, such removal occurring at the control unit.

The exhaust air oil trap may be mounted on the casting of the control unit by means of a cylindrical metal band 551 which embraces and clamps the transparent plastic vial 552. The band is secured by one of the screw bolts 553 threaded into a threaded bore 272a in the casting, such bolt being one of the bolts which also secures the conduit block 270a on the rear end of the conduits extending from the solenoid valve assembly 225.

As shown in FIGURE 21, vial 552 has an upper threaded end 554 for receiving a metal screw cap 555, such cap having a multiplicity of through apertures 556 in its upper wall 557. The screw cap 555 has a brass tube 558 braised or soldered in its upper wall 557 and extending into the vial 552 a distance substantially half the length of the vial (FIGURE 21).

The lower end 559 of the tube 558 is open; and the upper end of the tube 558 has a peripheral rib 560 for receiving the plastic tube 561, which is larger than the air supply tube that brings the driving air to the turbine. Inside the cap 555 and vial 552 and tube 558 is provided with an oil filter 562 comprising a plug of cotton gauze large enough to close the upper end of the vial 552 and adapted to absorb any oil remaining in the air before the air passes out of the apertures 556.

After the driving air has delivered its power to the turbine of the dental handpiece, the exhaust air, which may still contain some oil mist, is returned through the flexible tube 561 to the oil trap. The exhaust air is carried down to the middle of the vial 552 and its direction is reversed as it passes out of the end 559 of the tube 558 and goes upwardly through the gauze plug 562 and out through apertures 556. Some of the entrained oil is condensed on the walls of the vial 552 where it can be observed and emptied from time to time. Any remaining air must pass through the gauze filter plug 562 before it emerges from the top, and this filter element absorbs the remaining oil from the air so that the air which emerges is substantially free of entrained oil.

It will thus be observed that I have invented an improved control unit for air driven dental handpieces and an improved supply system whereby the air driven handpiece may be driven at any desired speed by manipulating the knob 222 on the control unit; and simultaneously air and water are directed on the bur from all sides for cooling the bur and the cavity walls.

The present control unit and supply system includes everything that is necessary for the continuous and efficient operation of the air driven handpiece and for its lubrication and supply of air which is free from particles or water which might injure the bearings or the parts of the turbine.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. A supply system for air driven dental handpieces, comprising a base casting having a first conduit with a threaded inlet bore to be connected to a supply of air provided by an air compressor, said first conduit extending to an enlarged bore communicating with a smaller counterbore, an air filter assembly having a cylindrical plug provided with an O ring engaging in said counterbore to seal one open end thereof, said plug having a bore communicating with a second inlet forming an outlet for the filter, a tube in said bore, a cap on the end of said tube, a filter element on said tube receiving air from said enlarged bore and passing air inwardly to apertures in said tube, and a transparent cylinder mounted between said casting and said cap and establishing a closed container about said filter element, said casting having a second enlarged threaded bore communicating with the outlet of the filter assembly, and a pressure regulator valve in said second enlarged bore communicating with a third conduit for discharging filtered air at reduced pressure to a pair of enlarged bores each containing a solenoid valve controlling air.

2. The structure of claim 1 in which said casting is provided with a second laterally extending conduit from said first bore to a second rear opening providing a front valve opening, a solenoid valve carried by a threaded bore in said front valve opening, a rear cover plate having a metal tube for discharging air to a flexible tube, said flexible tube extending to a lubricator providing a lubricant reservoir for supplying nebulized lubricant to air flowing from said flexible tube.

3. A supply system for air driven dental handpieces, comprising a base casting having a first conduit with a threaded inlet bore to be connected to a supply of air provided by an air compressor, said first conduit extending to an enlarged bore communicating with a smaller counterbore, an air filter assembly having a cylindrical plug provided with an O ring engaging in said counterbore to seal one open end thereof, said plug having a bore communicating with a second conduit forming an outlet for the filter, a tube in said bore, a cap on the end of said tube, a filter element on said tube receiving air from said enlarged bore and passing air inwardly to apertures in said tube, and a transparent cylinder mounted between said casting and said cap and establishing a closed container about said filter element, said casting having a second enlarged threaded bore communicating with the outlet of the filter assembly, a pressure regulator valve in said second enlarged bore communicating with a third conduit for discharging filtered air at reduced pressure to a pair of enlarged bores each containing a solenoid valve controlling air, the latter enlarged bores each supporting a threaded plug and having a tube supporting a pair of end plates clamping a cylindrical housing surrounding a coil on the tube, a magnetic core armature in the tube engaging a spring and engaging a valve seat in each of said latter enlarged bores.

4. A supply system for air driven dental handpieces comprising a base casting having a first conduit with a threaded inlet bore to be connected to a supply of air provided by an air compressor, said first conduit extending to an enlarged bore communicating with a smaller counterbore, an air filter assembly having a cylindrical plug provided with an O ring engaging in said counterbore to seal one open end thereof, said plug having a bore communicating with a second conduit forming an outlet for the filter, a tube in said bore, a cap on the end of said tube, a filter element on said tube receiving air from said enlarged bore and passing air inwardly to apertures in said tube, and a transparent cylinder mounted between said casting and said cap and establishing a closed container about said filter element, said casting having a second enlarged threaded bore communicating with the outlet of the filter assembly, a pressure regulator valve in said second enlarged bore communicating with a third conduit for discharging filtered air at a reduced pressure to a pair of enlarged bores each containing a solenoid valve controlling the flow of air, and a fourth conduit communicating with one of said pair of enlarged bores for conducting air from said pressure regulator valve to a lubricator assembly for providing the filtered and pressure-controlled air with a lubricant mist.

5. An air control assembly for dental handpieces, comprising a unitary casting having an air inlet for air under pressure, said air inlet communicating with a first conduit extending to a second transverse conduit communicating with an air filter for removing the moisture and solids from the air, said air filter discharging air through a third conduit in said casting having a threaded closure plug and having a valve opening opposite to said plug and leading to an enlarged counterbore, a pressure regulator valve in said counterbore for reducing the pressure of air discharged from said counterbore, said pressure regulating valve having a diaphragm in said enlarged counterbore and subject to air under pressure therein from said valve opening, said diaphragm engaging a valve in said opening responsive to air pressure on said diaphragm, said counterbore communicating with a fourth conduit extending to a threaded bore having a valve opening therein, a solenoid valve disposed in said last-mentioned threaded bore for opening and closing said valve opening and for controlling the flow of air to an air outlet, said outlet leading to an aperture closed by a plate having a metal tube conducting air to a flexible hose carried by said tube, said tube being connected to and communicating with a lubricator for introducing a lubricant mist into the air flowing from said tube.

References Cited by the Examiner

UNITED STATES PATENTS 2,612,728 10/1952 Jacobsson _____ 137—544 XR
2,855,672 10/1958 Frannick et al. _____ 32—28

M. CARY NELSON, *Primary Examiner.*

HENRY T. KLINKSIEK, *Examiner.*